[19] United States Patent
Tokutomi et al.

[11] 4,265,520
[45] May 5, 1981

[54] FOCUS DETECTING DEVICE IN SINGLE LENS REFLEX CAMERA

[75] Inventors: Seijiro Tokutomi, Tokyo; Masao Jyojiki, Tsurugashima; Kazuo Nakamura, Tokyo, all of Japan

[73] Assignee: Asahi Kogaku Kogyo Kabushiki Kaisha, Tokyo, Japan

[21] Appl. No.: 964,110

[22] Filed: Nov. 27, 1978

[30] Foreign Application Priority Data

Nov. 28, 1977 [JP] Japan .................... 52-142464
Nov. 28, 1977 [JP] Japan .................... 52-142465

[51] Int. Cl.³ .............................. G03B 3/10
[52] U.S. Cl. ........................ 354/23 D; 354/25; 354/31; 250/204
[58] Field of Search ............ 354/25, 31, 23 D; 352/140; 356/4; 250/201, 204

[56] References Cited

U.S. PATENT DOCUMENTS

| | | | |
|---|---|---|---|
| 3,898,676 | 8/1975 | Hosoe et al. | 354/31 |
| 3,938,894 | 2/1976 | Nanba | 354/25 |
| 3,945,023 | 3/1976 | Stauffer | 354/25 |
| 4,047,187 | 9/1977 | Mashimo et al. | 354/31 |
| 4,083,056 | 4/1978 | Nakamura et al. | 354/25 |
| 4,133,606 | 1/1979 | Hosoe et al. | 354/25 |
| 4,176,928 | 12/1979 | Nakamura et al. | 354/25 |

FOREIGN PATENT DOCUMENTS

| | | | |
|---|---|---|---|
| 2722804 | 12/1977 | Fed. Rep. of Germany | 354/25 |
| 2725451 | 2/1978 | Fed. Rep. of Germany | 354/25 |
| 2756061 | 6/1978 | Fed. Rep. of Germany | 354/25 |

Primary Examiner—L. T. Hix
Assistant Examiner—William B. Perkey
Attorney, Agent, or Firm—Sughrue, Rothwell, Mion, Zinn and Macpeak

[57] ABSTRACT

A focus detecting device in a single lens reflex camera having a lens system and an optical image splitter for splitting an object image into various partial images disposed at a position optically equivalent to that of a film surface in said single lens reflex camera. An array of photo-electric conversion devices are arranged into at least two rows, each row having a plurality of photo-electric conversion elements. The rows are disposed symmetrically with respect to a center line. The device includes an image projecting device for projecting the partial images onto the photo-electric conversion arrays. The projecting device has an optical axis which optically corresponds to said center line, the output of said conversion array defined by $$\sum_{p=1}^{l} \sum_{m=1}^{n-p} |i_m - i'_{m+p}| + \sum_{p=1}^{l} \sum_{m=1}^{n-p} |i'_m - i_{m+p}|.$$

The output of the conversion array has a maximum value when proper focus is obtained. In the equation: n is the number of said photo-electric conversion elements, p is the parameter of the mutual positional relationship of said photo-electric conversion elements for obtaining output difference, m is the element number of said photo-electric conversion elements, i and i' are outputs corresponding to incident light quantities of photo-electric conversion elements in said rows, and l is an integer defined by $1 \leq l \leq (n-1)$ and in the range of p.

16 Claims, 14 Drawing Figures

FOCUS DETECTING DEVICE IN SINGLE LENS REFLEX CAMERA

BACKGROUND OF THE INVENTION

This invention relates to a focus detecting device in a single lens reflex camera. In particular, it relates to an SLR focus device which electrically detects proper focus by utilizing the contrast of an object's image, or the variation in light and shade thereof when it becomes a maximum value.

There have been proposed in the prior art a number of electrical focus detecting methods. For instance, an electrical focus detecting method utilizing the variations of spatial frequencies of objects is disclosed in Published Unexamined Japanese Patent Application No. 56934/1975. An electrical focus detecting method utilizing the contrast of an image is shown in U.S. Pat. No. 3,688,673, and an electrical focus detecting method in U.S. Pat. No. 4,002,899 utilizes the fact that the image of an object is processed through two optical paths to obtain two images of the object. The two images are made to coincide with each other when the focalization is obtained.

However, the first method is not suitable for a single lens reflex camera because it is difficult to eliminate the movable parts of the electrical focus detecting device. Therefore, the device itself tends to be bulky and requires a large power source to drive the movable parts.

The second method is also disadvantageous in that it is necessary to provide a number of elements for detecting focus, namely, photo-electric conversion elements, and therefore the detecting circuit is rather intricate.

The third method requires a large number of movable parts as in the first method. In addition, the detection accuracy depends on the accuracy in relative position of the elements for detecting two images of the object. Therefore it is necessary to align the positions of the elements with a high degree accuracy. Furthermore, it is very difficult to form two optically equal images of an object with two optical paths in a single lens reflex camera.

Thus, problems to be solved exist if the conventional electrical focus detecting methods are to be used in a practical system in a single lens reflex camera.

SUMMARY OF THE INVENTION

Accordingly, an object of this invention is to provide a focus detecting device in a single lens reflex camera, which is high in accuracy attained.

It is another object of this invention to provide for a compact focus detecting device which is suitable for the single lens reflex camera, and in which the aforementioned movable parts are eliminated (although the photographing lens being movable).

Yet another object of this invention is to provide for a focus detecting device using a relatively simple electrical circuit is employed, and segments of focus detecting information, or contrast difference, are provided by a relatively small number of photo-electric conversion elements.

Still another object of this invention is to provide for a focus detecting device where special optical systems are unnecessary.

DESCRIPTION OF THE PREFERRED EMBODIMENTS

Preferred embodiments of this invention will be described with reference to FIGS. 1 through 13. Those figures will first be interrelated.

Figure 1:
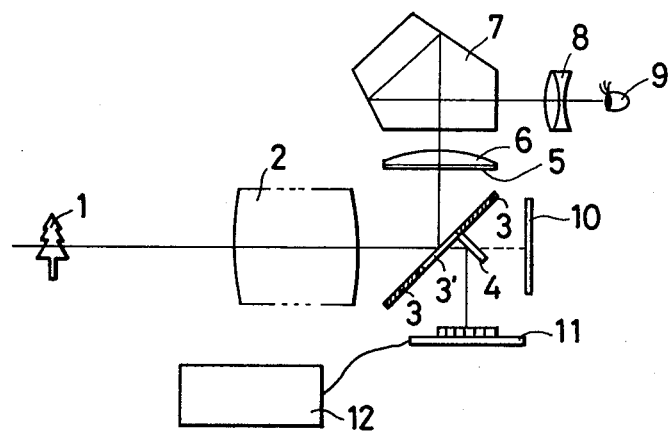
FIG. 1 is a schematic diagram showing an optical system of an SLR camera equipped with the focus detecting device in accordance with this invention.

Referring now to FIG. 1 an explanatory diagram shows an optical system of a single lens reflex (SLR) camera equipped with an electrical focus detecting device according to the invention. In FIG. 1, an object 1 to be photographed is focussed through a group of lenses 2 (hereinafter referred to merely as "a photographing lens 2", when applicable). The camera has a first total reflection mirror 3 with a half mirror section 3' in the center. A second total reflection mirror 4 is positioned perpendicular to the first mirror section. A focussing screen 5 with a condenser lens 6, a pentaprism 7 and an eye piece 8 for a photographer's eye 9 forms the viewing system.

Figure 10:
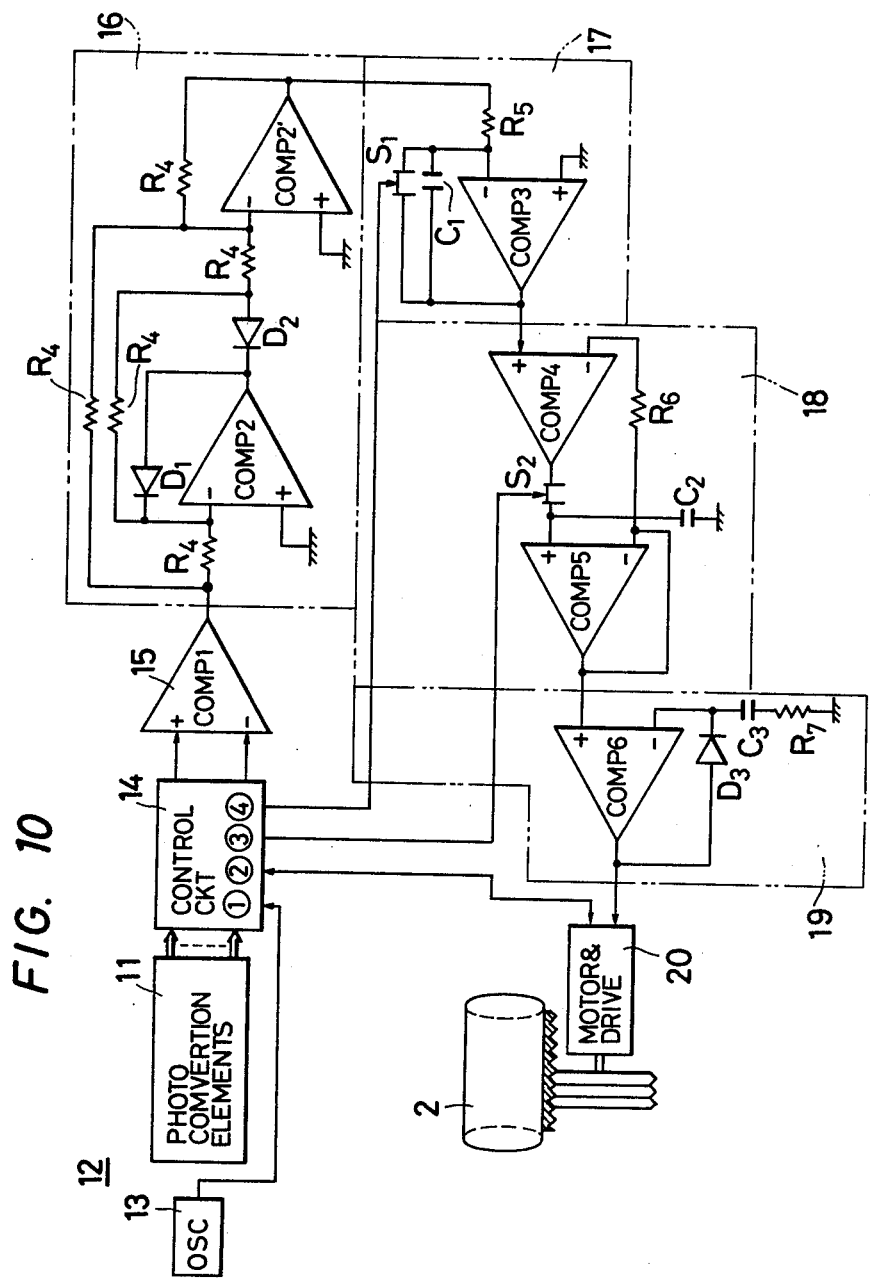
FIG. 10 is a block diagram of the processing device according to this invention.
Figure 12:
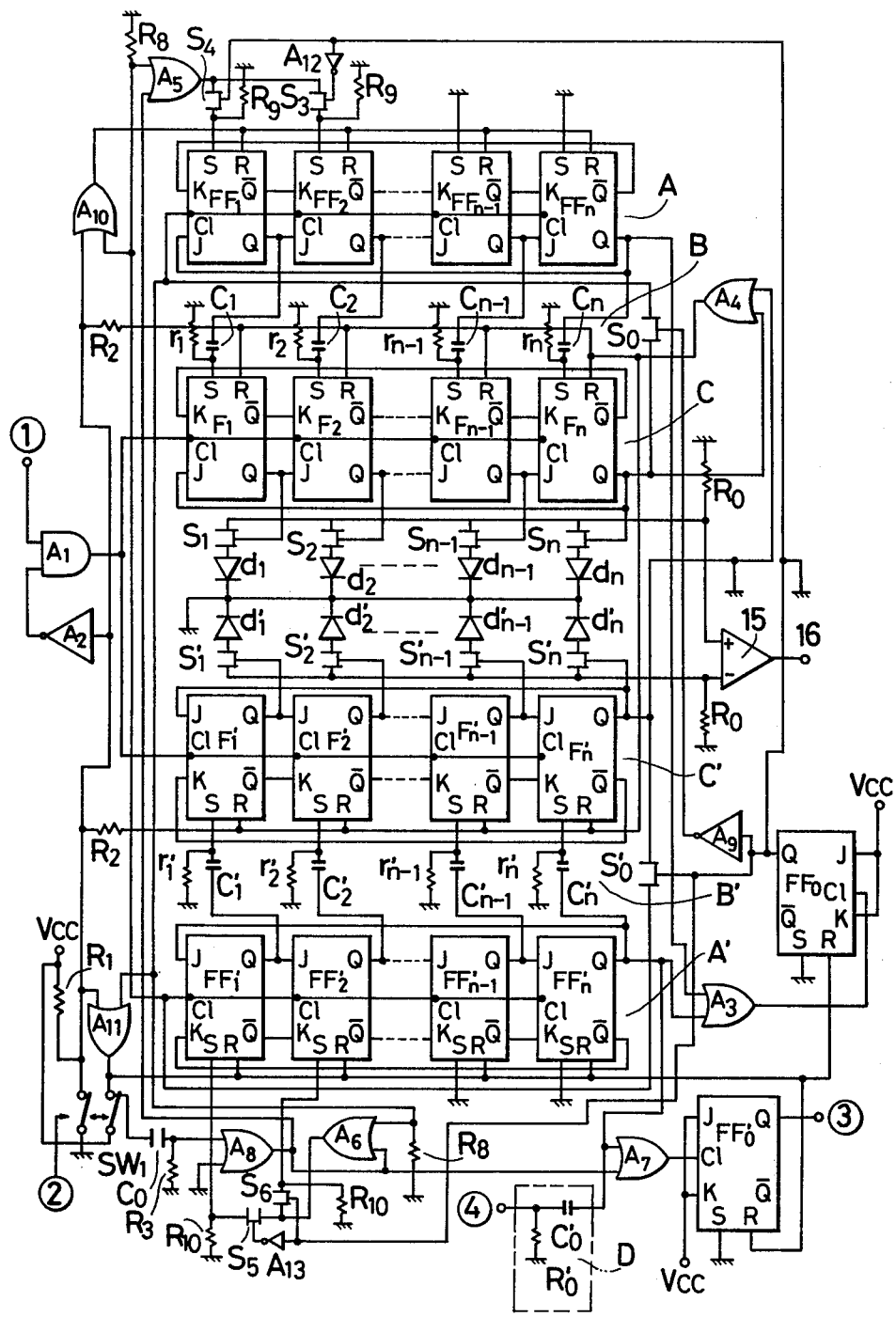
FIG. 12 is a circuit diagram of the control circuit for the first preferred embodiment of this invention.
Figure 13:
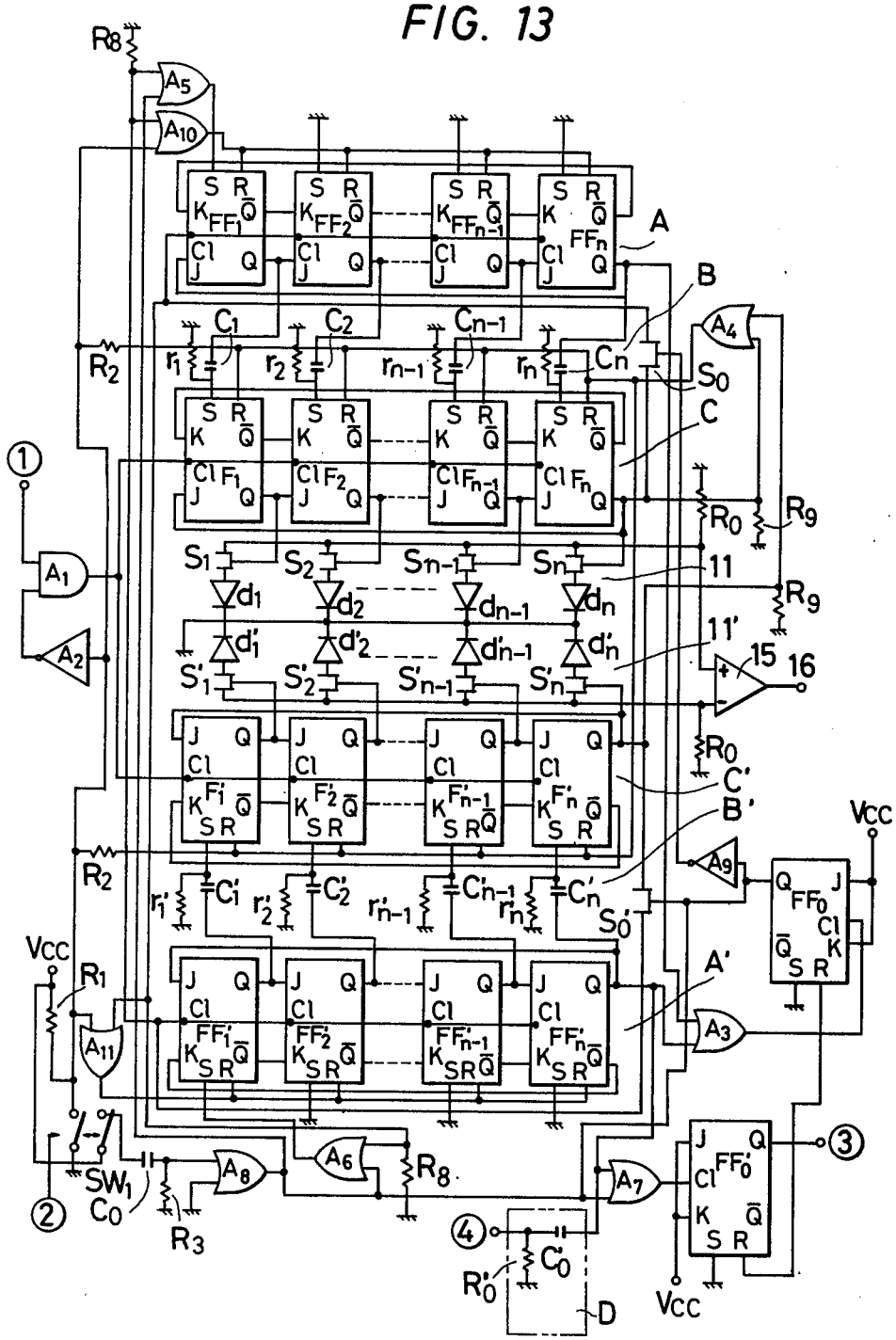
FIG. 13 is a circuit diagram of the control circuit for the second preferred embodiment of this invention.

Also shown in FIG. 1 is a film 10 and a group of paired minute photo-electric conversion elements $d_1$, $d_1'$ ... $d_k$, $d_k'$ ... $d_n$, $d_n'$ each having a minute light receiving surface (hereinafter referred to merely as "a photo-electric conversion element group 11", when applicable) coupled to a processing device 12 for processing the outputs of the photo-electric conversion element group 11 to carry out electrical focus detection. The processing device 12 is illustrated in FIGS. 10, 12 and 13 in detail and will be explained in greater detail herein.

Figure 2:
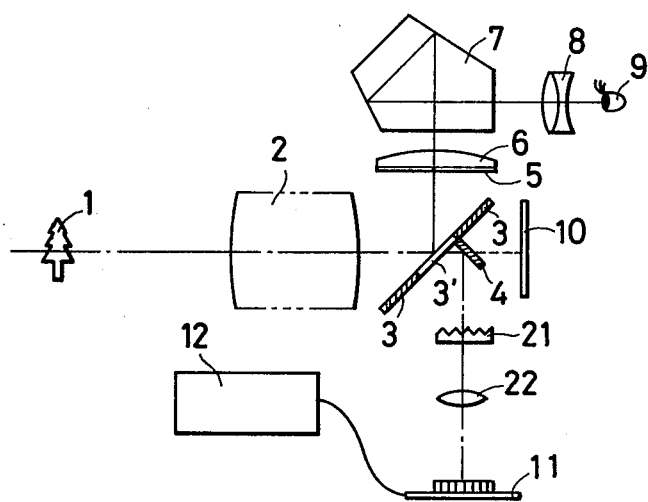
FIG. 2 is schematic diagram showing an optical system for an SLR camera equipped with the focus detecting device in accordance with this invention including an optical image splitter.

FIG. 2 is an explanatory diagram showing an optical system of an SLR camera with an electrical focus detecting device according to the invention, which includes an optical image splitter 21. The image splitter may be a microprism disposed at a position optically equivalent to the position of the film 10, and an image projecting lens 22 is adapted to project the object's image onto the photo-electric conversion element group 11.

Figure 3:
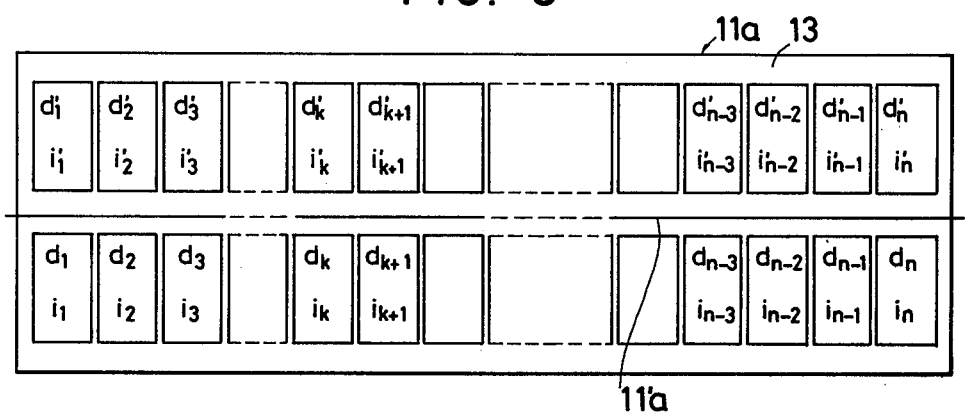
FIG. 3 is a plan view of a first example of a photo-electric conversion element group according to this invention.

FIG. 3 shows a first example of the photo-electric conversion element group 11a in detail. The light receiving surfaces of the photocells $d_1$ through $d_n$ and $d_1'$ through $d_n'$, which have equal electrical characteristic and light receiving areas, are symmetrically disposed with respect to a center line $11a'$. Reference characters $i_1$ through $i_n$ and $i_1'$ through $i_n'$ designate the outputs of the respective photocells $d_1$ through $d_n$ and $d_1'$ through $d_n'$. The outputs are proportional to the light quantity or intensity of the incident pencils of light rays.

FIGS. 4(a) and 4(b) are schematic perspective views illustrating preferred examples of the image projecting lens 22 which are applicable to the first embodiment employing the photo-electric conversion element group 11a as shown in FIG. 3. As shown in FIGS. 4(a) and 4(b), a convex cylindrical lens 24 or 26 is cemented with a concave cylindrical lens 25 or 27 to form an elliptic projecting lens 22. In this case, assuming that an incident light goes into the elliptic lens as indicated by an arrow as shown, an image formed by the lens is enlarged only in a $D_y$ axis direction, while the image formed is not enlarged in a $D_x$ axis direction. In addition, the elliptic lens is positioned so that the $D_x$ axis shown in FIGS. 4(a) and 4(b) is optically equivalent to the center line $11a'$ shown in FIG. 3.

Figure 4:
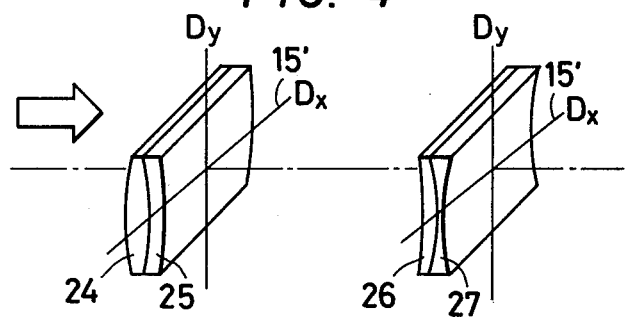
FIG. 4 shows schematic perspective views illustrating examples of the image projecting lens applicable to the FIG. 3 conversion element group.
Figure 5:
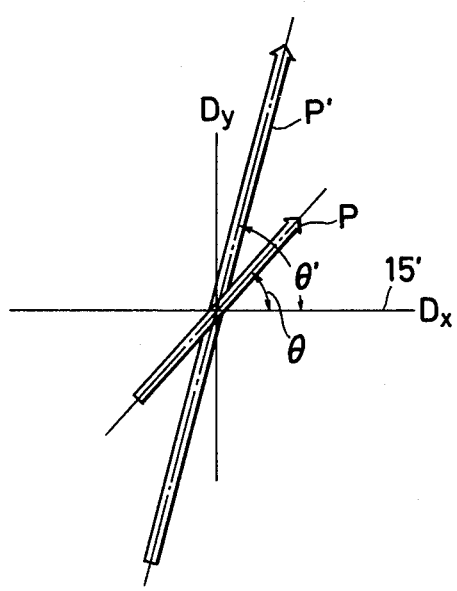
FIG. 5 is an explanatory diagram showing the variation between image projections using a standard projecting lens and one in accordance with this invention.

FIG. 5 is an explanatory diagram illustrating the variation between an object's image P projected onto the conversion element group 11 through a normal image projecting lens and an object's image P' projected through the elliptic projecting lens 22a or 22b shown in FIGS. 4(a) and 4(b). That is, FIG. 4 indicates that the gradient of image P is increased to that of image P' by projecting through the elliptic projecting lens of FIG. 4.

Figure 6:
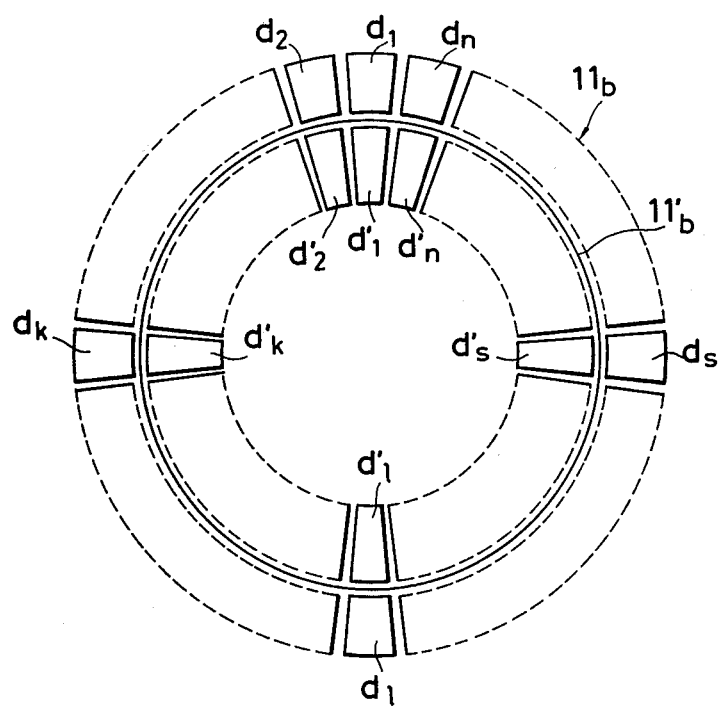
FIG. 6 is a plan view showing a second example of a photo-electric conversion element group according to this invention.
Figure 7:
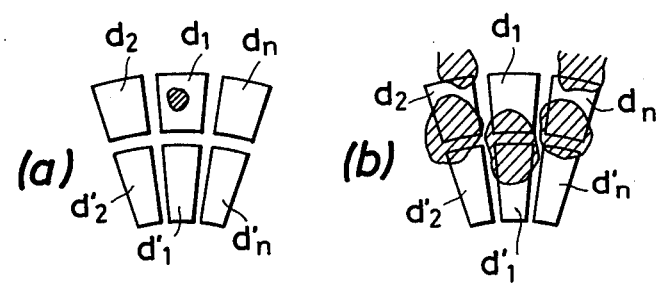
FIGS. 7(a) and 7(b) are explanatory diagrams illustrating the projection of an object's image onto the photo-electric conversion element of FIG. 6.

FIG. 6 shows the second example of the photo-electric conversion element group 11b. The light receiving surfaces of the photocells $d_1$ through $d_n$ and $d_1'$ through $d_n'$, having equal electrical characteristics and light receiving areas, are concentrically disposed with respect to a center circle $11b'$. The photocells are arranged in such a manner that $d_1$ and $d_1'$, ..., $d_n$ and $d_n'$ are respectively paired and the $d_1$ and the $d_n$, and the $d_1'$ and the $d_n'$ are arranged adjacently to each other, respectively.

FIGS. 7(a) and 7(b) are explanatory diagrams illustrating an object's image which is projected onto the photo-electric conversion element group 11 shown in FIG. 6 through the optical image splitter, respectively. FIG. 7(a) shows an object's image when focalization is complete. FIG. 7(b) shows an object's image when focalization is incomplete.

Figure 8:
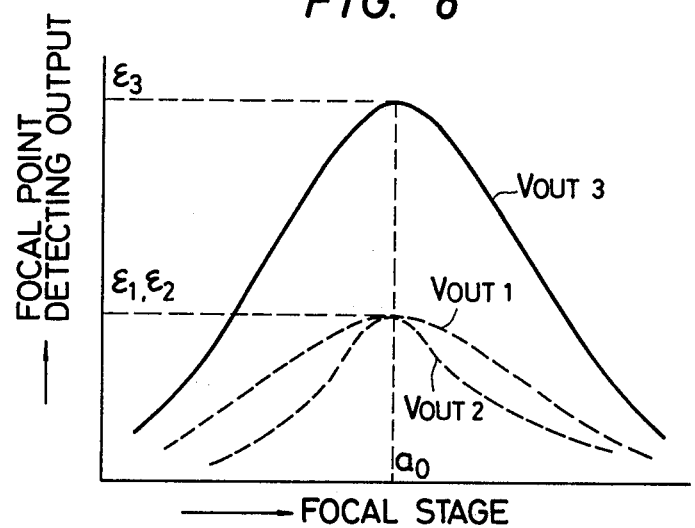
FIGS. 8 and 9 are graphical representations plotting focal point detecting output vs. focal stage for the first and second preferred embodiments according to this invention.
Figure 9:
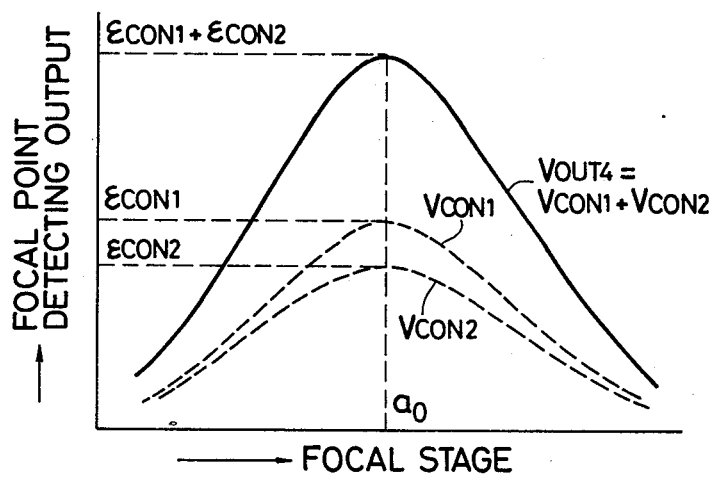

FIGS. 8 and 9 are graphical representations indicating focus detecting outputs in the first and the second preferred embodiments according to the invention.

FIG. 10 is a block diagram of the aforementioned processing circuit 12. The circuit comprises an oscillation circuit 13, the group of photo-electric conversion elements 11 and a control circuit 14 receiving inputs from the oscillator and conversion elements. A differential circuit 15 receives control circuit output and an absolute value circuit 16 is coupled to the differential circuit. An integrating circuit 17, a sample and hold circuit 18, an extreme value detecting circuit 19, and a motor driving circuit 20 including an electric motor for operating the photographing lens 2 complete the processing circuit.

Figure 11:
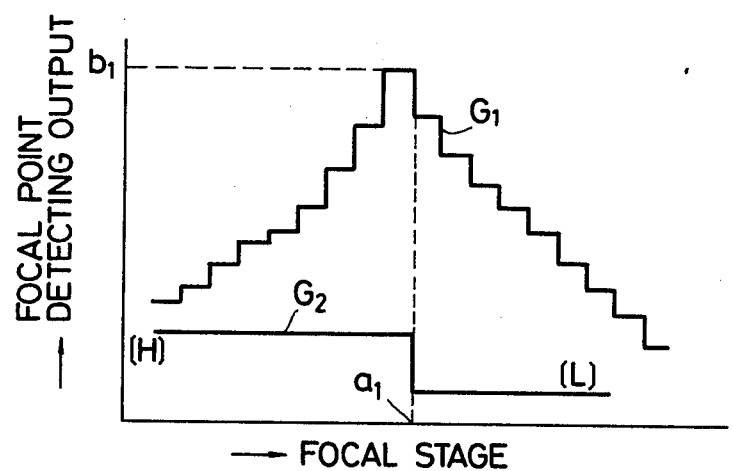
FIG. 11 is a graph plotting focal point detecting output vs. focal stage for FIG. 10.

FIG. 11 is a graphical representation indicating the output ($G_1$) of the sample hold circuit 18 and the output ($G_2$) of the extreme value detecting circuit 19.

FIG. 12 is a diagram of the control circuit 14a in the processing device 12 of the focus detecting which employs the first example of the photo-electric conversion element group 11a. The control circuit 14a comprises ring counters A, A', C and C', differential circuits B and B', a delay circuit D, and various control signal circuits.

FIG. 13 is a detailed diagram of the control circuit 14b in the processing device 12 of the focus detecting device which employs the second example of the photo-electric conversion element group 11b. The control circuit 14b comprises the same essential elements as the above control circuit 14b.

The focus detecting principle according to the invention utilizes the fact that the contrast of an object's image depends upon how precisely the focalization is achieved, and the highest contrast is obtained when the object is completely focussed. The term "contrast" as herein used in not a strictly optical "contrast", but it is intended to mean merely the difference of incident luminous flux, i.e., the variations in brightness (or incident luminous flux) of various parts of an object's image. Hence, in this definition "contrast" is the difference in output of the photo-electric conversion elements. With this definition of the contrast, the highest contrast can be obtained when focussing is completely achieved. It is assumed that the incident luminous flux of a minute parts $\Delta S$ of an object's image and that of another minute part $\Delta S'$ of the same object's image, remote from the first mentioned minute part $\Delta S$, are represented by $\Delta F$ and $\Delta F'$, respectively. In this case, since the group of photo-electric conversion elements is designed so that elements $d_1$ through $d_n$ and $d_1'$ through $d_n'$ are equal to one another in light receiving area and the outputs $i_1$ through $i_n$ and $i_1'$ through $i_n'$ corresponding to incident luminous fluxes are equal to one another when the incident luminous fluxes are equal to one another, and the outputs $\Delta F$ through $\Delta F'$ are zero (0) when $\Delta F = \Delta F'$. Furthermore, the contrast is highest when the focalization is obtained as described above. Therefore, in view of probability, the outputs $\Delta F$ through $\Delta F'$ become maximized for the two remote minute parts of the object's image when the focalization is obtained.

The first preferred embodiment of electrical focus detecting device including the first example of the photo-electric conversion element group 11a shown in FIG. 3 will now be described with reference to FIGS. 2 to 5, 8 to 12 and 14.

Referring to FIG. 2, the light from the object 1 is applied through the photographing lens 2 to the total reflection mirror 3 where it is reflected and the image of the object 1 is formed on the focussing screen 5. The objects's formed image is viewed through the condenser lens 6, the penta-prism 7 and the eye piece 8 by the photographer's eye 9. On the other hand, the light from the object 1, passing through the half mirror 3' provided in the center of the total reflection mirror 3, is reflected by the total reflection mirror 4. As a result, an equivalent image of the object is projected onto the photo-electric conversion element group $11a$ through the optical image splitter 21. This can typically be micro-prism disposed at a position optically equivalent to the position of the film 10 and the image projecting lens 22.

As shown in FIG. 3, the elements $d_1 \ldots d_k \ldots d_n$ and $d_1 40 \ldots d_k' \ldots d_n'$ are physically very close to one another, respectively and are symmetrically disposed with respect to the center line $11a'$. Values $d_1 - d_1' \ldots d_n - d_n'$ (hereinafter referred to as "contrast 1 outputs", when applicable) show the magnitudes of contrast. These values become maximum when the focalization is obtained, because the contrast becomes highest when the focalization is obtained. The differences between $d_1$ and $d_2', \ldots d_{n-1}$ and $d_n'$, and $d_1$ and $d_3' \ldots d_{n-2}$ and $d_n'$, and $d_1$ and $d_4' \ldots d_{n-3}$ and $d_n' \ldots$ and $d_1'$ and $d_2 \ldots d_{n-1}'$ and $d_n$ and $d_1'$ and $d_3 \ldots d_{n-2}'$ and $d_n$ and $d_1'$ and $d_4 \ldots d_{n-3}'$ and $d_n \ldots$, that is, values $|d_1 - d_2'| \ldots |d_{n-1} - d_n'|$ and $|d_1 - d_3'| \ldots |d_{n-2} - d_n'|$, and $|d_1 - d_4'| \ldots |d_{n-3} - d_n'| \ldots$ and $|d_1' - d_2| \ldots |d_{n-1}' - d_n|$, and $|d_1' - d_3| \ldots |d_{n-2}' - d_n|$ and $|d_1' - d_4| \ldots |d_{n-3}' - d_n| \ldots$ (hereinafter referred to as "contrast 2 outputs", when applicable) become, in probability, highest values when the focalization is obtained. With 2n photo-electric conversion elements, the number of focus detection output information (or the output difference of two minute photo-electric conversion elements) is $2 \times \{(n-1) + (n-2) + \ldots + 1\}$. For instance, with $n = 10$, the number of focus detection output information is 90, which leads to the detection with higher accuracy.

Therefore, if the sum of the above-described contrast 1 outputs is represented by $V_{CON1}$, then:

$$V_{CON1} = \sum_{m=1}^{m} |i_m' - i_m|$$

If the sum of the above-described contrast 2 outputs is represented by $V_{CON2}$, then:

$$V_{CON2} = \sum_{p=1}^{n-1} \sum_{m=1}^{n-p} (|i_m' - i_{m+p}| + |i_m - i_{m+p}'|)$$

Furthermore, the outputs obtained complete focussing is achieved are represented by $\epsilon_{CON1}$ and $\epsilon_{CON2}$, respectively, then $$\epsilon_{CON1} \geq V_{CON1}, \epsilon_{CON2} \geq V_{CON2}$$

In this embodiment, due to the arrangement of the photo-cells, $V_{CON2}$ is only employed as a focus detection output $V_{OUT1}$ as shown in FIG. 8. Furthermore, in this case, if an optical image splitter such as a microprism is used in combination, the contrast is further degraded at a point other than the point where the focalization is obtained. This output is shown as $V_{OUT2}$ in FIG. 8. As is apparent from FIG. 8, the inclination of the output $V_{OUT2}$ in the vicinity of the correct focal position becomes more sharply peaked, and therefore the focal point detection accuracy is higher. Moreover, the accuracy is further improved by employing an elliptic lens 22 as shown in FIGS. 4(a) and 4(b) as an image projecting lens.

With such a construction, assuming that an objects's image P is enlarged by an elliptic lens as shown in FIGS. 4(a) and 4(b) in the $D_y$ direction, the images P and P' are represented by the following equations:

$D_{Oy} = l \cdot \sin\theta$;
$D_{Ox} = l \cdot \cos\theta$;
$D_{Oy'} = D_{Oy} \cdot M_y$;
$D_{Ox'} = D_{Ox} \cdot M_x$; and $\tan\theta = D_{Oy}/D_{Ox}$, where:

"l" is a length of image P which is projected through a normal image projecting lens;

"$\theta$" is the angle of the image P with respect to a $D_X$ axis;

"$M_y$" is an image magnification in a $D_y$ axis; ($M_y > M_x$)

"$D_{Oy}$" is the length of the image P in the $D_y$ axis direction;

"$D_{Ox}$" is the length of the image P in the $D_x$ axis direction;

"$D_{Oy'}$" is the length of an image P' in the $D_y$ axis direction, that is projected through the elliptic lens;

"$D_{Ox'}$" is the length of the image P' in the $D_x$ axis direction.

Furthermore, assuming that an angle of the image P' with respect to the $D_x$ axis is $\theta'$, $$\tan\theta' = D_{Oy'}/D_{Ox'} = D_{Oy}/D_{Ox} \cdot M_y/M_x$$
$$= \tan\theta \cdot M_y/M_x$$

In this case, because $M_y$ is larger than $M_x$, $D_{Oy'}$ becomes larger than $D_{Ox'}$. Accordingly, the image P' approaches the $D_y$ axis. The center line $11a'$ is positioned to be optically equivalent to the $D_x$ axis. When a linear image is projected over the photo-cells, $d_k$ and $d_{k-1}$, for instance, and then focalization is complete. Even if $i_k \sim i_k' = 0$, the linear image is also projected over the photo-cells $d_k$ and $d_k'$, or $d_{k-1}'$. Accordingly, there is virtually no possibility that both the difference between the outputs $i_k$ and $i_{k-1}'$ and that between the outputs $i_k'$ and $i_{k-1}$ is equal to zero. Therefore the focus detection output $V_{OUT3}$ shown in FIG. 8 becomes more sharply peaked and the result is that focal point detection is accordingly improved with respect to a complicated image.

FIG. 10 is a block diagram (partly as a detailed diagram) showing the processing circuit 12 of FIG. 2. The circuit 12 is common to the outputs $V_{OUT1}$, $V_{OUT2}$ and $V_{OUT3}$. The operation of the processing circuit will therefore only be described with respect to the output $V_{OUT3}$.

The outputs of the group of photo-electric conversion elements 11 proportional to the respective luminous fluxes are applied to the differential circuit 15, comparator COMP1, in a predetermined order by means of the control circuit 14. The difference between the output of two photo-electric conversion elements is the output of comparator COMP1. This output difference is applied to one terminal (−) of a comparator COMP2 in the absolute value circuit 16. The output of circuit 16 is the absolute value with the aid of diodes $D_1$ and $D_2$, a resistor $R_4$ and a comparator COMP2'. The absolute value thus generated is subjected to integration by a comparator COMP3, a capacitor $C_1$ and a resistor $R_5$ in the integrating circuit 17.

One example of a circuit for obtaining the focus detection output $V_{OUT3}$ according to the invention is as described above. In this connection, $$V_{OUT3} = \sum_{p=1}^{l} \sum_{m=1}^{n-p} |i_m - i_{m+p}'| + \sum_{p=1}^{l} \sum_{m=1}^{n-p} |i_m' - i_{m+p}|$$

where $1 \leq l \leq (n-1)$.

The sample and hold circuit 18 is controlled by the control circuit 14. For instance, when the aforementioned focus detection output $V_{OUT3}$ is provided, a switch $S_2$ is short-circuited, and the value at this instant is produced as an output by means of comparators COMP4 and COMP5, a resistor $R_6$ and a capacitor $C_2$. In the case when the switch $S_2$ is open, the output $V_{OUT3}$ is held by the capacitor $C_2$. In FIG. 11, reference character $G_1$ indicates a state of output of the sample and hold circuit 18.

The photographing lens 2 is driven by the motor and motor driving circuit 20 in such a manner that it is moved in one direction from $\infty$ to a near point or from a near point to $\infty$ and it is stopped when the focalization is obtained, in response to the output from the control circuit 14. Therefore, the output of the sample and hold circuit 18, as indicated by the curve $G_1$ in FIG. 11, is at first small, and then gradually increases to reach the maximum value (in this case where the focalization is obtained). Thereafter, the output of the sample and hold circuit 18 is decreased. In order to obtain this maximum value, the output $G_1$ is applied to the extreme value detecting circuit 19, where it is processed by a comparator COMP6, a diode $D_3$, a capacitior $C_3$ and a resistor $R_7$, so that when the input is changed from its large value to its small value, and the output of the comparator COMP6 is inverted. As a result the motor and motor driving circuit 20 is terminated to stop the movement of the photographing lens 2. At this moment, the proper focus is achieved.

The output in this case is as indicated by the curve $G_2$ in FIG. 11, in which reference character $a_1$ designates the position where the proper focus has been obtained. Reference numerals ① through ④ in the control circuit 14 designate control signals in FIG. 10. The control signal ① is to deliver a signal from the oscillation circuit 13, by which all is controlled in time. The control signal ② is a synchronizing signal from the motor and motor driving circuit 20, which is adapted to inform the start time and stop time of the motor to the control circuit. The control signal ③ is used to control the switch $S_2$ in the sample and hold circuit 18 to thereby cause the extreme value detecting circuit 19 to produce the output of the integrating circuit 17. The switch $S_2$ can be short-circuited for a short time by the control signal ③. The control signal ④ is to control the switch $S_1$ of the integrating circuit 17 in such a manner that the switch $S_1$ is opened during the integration of the focus detection output $V_{OUT3}$, and is then closed after the application of the output $V_{OUT3}$ to the sample and hold circuit 18 through the closed switch $S_2$. In FIG. 10, the arrow indicates the direction of control.

FIG. 11 is a graphical representation indicating the relations between lens extending position and focus detection output. In FIG. 11, the outputs of the sample and hold circuit 18 and the extreme value detecting circuit 19 are indicated by $G_1$ and $G_2$, respectively. Reference characters H and L on the output curve $G_2$ designate a high level signal and a low level signal, respectively.

FIG. 12 is detailed circuit diagram of the control circuit 14 shown in FIG. 10. This circuit is suitable to the output $V_{OUT3}$ where $l=n-1$. In FIG. 12, reference characters A, A', C, C', $FF_O$ and $FF_O'$ designate J-K flip-flops. Reference characters B and B' are differential circuits, and reference character $A_1$ is an AND circuit. Reference characters $A_2$, $A_9$, $A_{12}$ and $A_{13}$ define inverter circuits and reference characters $A_3$ through $A_8$, $A_{10}$ and $A_{11}$ represent OR circuits. Reference character D is a delay circuit, character C is a capacitor, R, a resistor and reference character S is a switch such as an analog switch.

Figure 14:
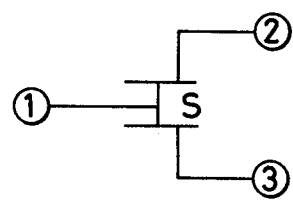
FIG. 14 is a diagram showing a switch shown in FIGS. 12 and 13.

The operation of the switch is that shown in a switch of FIG. 14. When the terminal ① is at a high level, the terminals ② and ③ are shorted, and when the terminal 1 is at a low level, an open state is established between the terminals 2 and 3; that is, the switch is open. Hereinafter, the high level and the low level will be abbreviated into "H" and "L", respectively, when applicable. In the case of the J-K flip-flop, the terminal Q is at "H" when the terminal S is at "L" and the terminal R is at "H". The terminal Q is at "L" when the terminal S is at "H" and the terminal R is at "L".

The operation of the control circuit of FIG. 12, will now be further described. When a switch $SW_1$ (for instance, the start switch of the focus detecting device) is in "off" state, the terminals S of the respective flip-flops are set "L", and the terminals R are set to "H". Thus, all the terminals Q are set to "L". As a result, the switches $S_O$, $S_3$ and $S_5$ are placed in short state, while the switches $S_O'$, $S_4$ and $S_6$ and the switch groups $S_1$ through $S_n$ and $S_1'$ through $S_n'$ are placed in short state. The control signal ① from the oscillation circuit 13 is interrupted by the AND circuit $A_1$. Accordingly, the control signals ③ and ④ are at "L".

When the switch $SW_1$ is turned on, with the aid of the control signal ② the photographing lens 2 is moved in one direction from $\infty$ to near a point (or near point to $\infty$) by the operation of the motor and motor driving circuit 20. As a result the reset states of all the flip-flops are released. Thereafter, the terminals S of the flip-flops $FF_2$ and $FF_1'$ are momentarily set to "H" by means of the capacitor $C_O$, the resistor $R_3$ and the OR circuits $A_8$, $A_5$ and $A_6$. Therefore, the terminals Q are raised to "H". As a result, the terminals S of the flip-flops $F_2$ and $F_1'$ are also raised to "H" momentarily with the aid of the resistors $R_1$ and $R_2'$ and the capacitors $C_1$ and $C_2'$. The terminals Q are raised to "H". Thus, the switches $S_2$ and $S_1'$ are placed in a shorted state, and the output difference $i_{2\sim i1}'$ of the photo-electric conversion elements $d_2$ and $d_1'$ is obtained at the output of the differential circuit 15.

With the aid of the inverter $A_2$ and the AND circuit $A_1$, a repetitive pulse is applied to the clock terminals of the flip-flops in the groups C and C'; by the control signal ① from the oscillation circuit 13. Therefore, the terminals Q of the flip-flops $F_3$ and $F_2'$ are set to "H", and the switches $S_3$ and $S_2'$ are placed in short state. In other words, as in the above-described case, the output difference $i_3\sim i_2'$ is obtained at the output of the differential circuit 15. The flip-flops in each of the groups A, A', C and C' form a ring counter, and therefore the number of the terminals Q at "H" is only one in each group at all times.

Next, by the pulse of the control signal ①, the terminals Q of the flip-flops $F_4$ and $F_3'$ are set to "H", and the output difference $i_4\sim i_3'$ is obtained at the output of the differential circuit 15. Similarly, the terminals Q of the flip-flops $F_n$ and $F_{n-1}'$ are set to "H", and the output difference $i_n\sim i_{n-1}'$ is provided at the output of the differential circuit 15. Also the flip-flops in the groups C and C' are reset by means of the OR circuit $A_4$. Accordingly, all of the terminals Q are set to "L". Because the switch $S_O$ is placed in a shorted state, the terminal Q of the flip-flop $FF_3$ in the group A is momentarily set to "H" and the terminal Q of the flip-flop FF; in the group A' is also momentarily set to "H" via the OR circuit $A_6$ and the switch $S_5$. As a result, the terminals Q of the flip-flops $F_3$ and $F_1'$ are raised to "H" and the output difference $i_3 \sim i_1'$ is thus obtained at the output of the differential circuit 15.

Similary, with the aid of the pulses of the control signal ①, the outputs $i_4, i_2, \ldots i_n, i_{n-2}$ can be obtained at the output of the differential circuit 15. In succession with this operation, the terminals Q of the flip-flops $FF_4$ and $FF_1'$ in the groups A and A' are respectively raised to "H", and then the outputs $i_4 \sim i_1'$, $i_5 \sim i_2'$, ..., $i_n \sim i_{n-3}'$ can be obtained at the output of the differential circuit 15. Similarly, in turn the outputs $i_6 \sim i_1'$, $i_6 \sim i_1$; 40, ..., $i_{n-4}'$, ..., $i_n \sim i_1'$ can be obtained at the output of the differential circuit 15. At the same time, the output from the terminal Q of the flip-flop $FF_n$ is fed to the OR circuit $A_3$, and as a result the terminal Q of the flip-flop $FF_O$ is inverted to "H" and then the switches $S_O$, $S_3$ and $S_5$ is placed in open state and the switches $S_O'$, $S_4$ and $S_5$ are placed in short state. Accordingly, the outputs $i_2' \sim i_1$, $i_3 \sim i_2$, ..., $i_n' \sim i_{n-1}$, $i_3' \sim i_1$, $i_4' \sim i_2$, ..., $i_n' \sim i_{n-2}$, ..., $i_n' \sim i_1$ can be obtained at the output of the differential circuit 18. The above outputs are applied to various circuits in FIG. 10 so as to obtain the focus detection output of the present invention.

$$V_{OUT3} = \sum_{p=1}^{n-1} ( \sum_{m=1}^{n-p} | i_{m+p} - i_m' | + \sum_{m=1}^{n-p} | i_{m+p} - i_m |)$$

This operation is repeated by the inversion of the state of flip-flop $FF_O$, so that the focus detection outputs $V_{OUT3}$ for the lens extending positions can be obtained. The output $V_{OUT3}$ is applied to the extreme value detecting circuit 19 in FIG. 10 to measure or determine the completion of focus detection.

In the above-described control circuit, the maximum value of p is $(n-1)$, however, the following equations of focus detection output in a range of $(l=1, 2, 3, \ldots, n-1)$:

Focus detection output $V_{OUT3} =$ $$\sum_{p=1}^{l} ( \sum_{m=1}^{n-p} | i_{m+p} - i_m' | + \sum_{m=1}^{n-p} | i'_{m+p} - i_m |).$$

In this connection, the smaller the value l, the less the amount of focus detection output information.

The control signal ③ is set to "H" for the operation of the OR circuit $A_7$ and the flip-flop $FF_O'$ during the calculation of the output $V_{OUT3}$. The control signal ④ is set to "H" for a period of time a little later than the above-described calculation by means of the capacitor $C_O'$ and the resistor $R_O'$. That is to say, the signal controls the sampling time of the sample and hold circuit 18. The control signal ② operates to turn off the switch $SW_1$ when the focalization is obtained, i.e., when the photographing lens 2 is stopped. When the switch $SW_1$ is again turned on, the photographing lens is returned to the position of ∞ or the near point. The switch $SW_1$ may be operated in such a manner that after one output $V_{OUT3}$ has been detected, it is turned off and then it is turned on again. However, in this case, it is necessary to stop the on-off operation of the switch $SW_1$ when the photographing lens is stopped, and to return the photographing lens to the position of ∞ or the near point when the focus detection is started.

The resistors $R_1$ through $R_{10}$ are provided to maintain the inputs to the various logic elements related to the ground. The resistor $R_O$ is the input resistance of the comparator 15. If self-scanning type elements are employed as the photo-electric conversion elements, the constructions of the control circuit 14, etc. can be simplified. The outputs of the group of photo-electric conversion elements 11 may be applied to the differential circuit 15 after being subjected to compression.

The second preferred embodiment of electrical focus detecting device including the second example of the photo-electric conversion element group 11b shown in FIG. 6 will now be described with reference to FIGS. 1, 2, 6, 7, 9, 10, 11, 13 and 14.

Referring to FIG. 1, this optical system of SLR camera is obtained by omitting the optical image splitter 21 and the image projecting lens 22 from the above mentioned first preferred embodiment shown in FIG. 2. The photo-electric conversion element group 11b as shown in FIG. 6 is disposed at a position optically equivalent to the position of the film 10. In this case, the light from the object 1 which passes through the half mirror 3' provided in the center of the total reflection mirror 3, is reflected by the total reflection mirror 4. As a result, an equivalent objects's image is projected onto the photo-electric conversion element group 11b.

In this second embodiment, the composite output of the contrast 1 outputs and the contrast 2 outputs which have been explained in the explanation as to the first embodiment, is employed as the focus detection output $V_{OUT4}$. The composite output $V_{OUT4}$ is represented by the following expression: That is, $$V_{OUT4} = V_{CON1} + V_{CON2} = \sum_{p=0}^{n-1} \sum_{m=1}^{n-p} | i_m - i_{m+p} | + \sum_{p=1}^{n-1} \sum_{m=1}^{n-p} | i_m' - i_{m+p} |$$

As is apparent from FIG. 9, the inclination of the curve in the vicinity of the focalization position $a_O$ becomes steep as $V_{OUT4} > V_{CON1}$ or $V_{CON2}$.

Therefore, the focus detection can be achieved with high accuracy, and in addition the luminous fluxes of various parts can be subjected to comparison. Accordingly, more focus detections of ordinary images can be carried out. In this connection, if the optical image splitter 21 such as a micro-prism is used in combination, the contrast is further degraded at a point other than the point where the focalization is obtained. Therefore in this case, the inclination of the focus detection output in the vicinity of the focalization position, improves the detection accuracy.

The processing circuit 12 of the second preferred embodiment is the same as that of the first preferred embodiment except the control circuit 14b.

The control circuit 14b will be described with reference to FIGS. 13 and 14.

In FIG. 13, reference character A, A', C, C;40, $FF_O$ and $FF_O'$ designate J-K flip-flops. Reference characters B and B' indicate differential circuits and the reference character $A_1$, an AND circuit. $A_2$ and $A_9$ are inverter circuits and reference characters $A_3$ through $A_8$, $A_{10}$ and $A_{11}$ designate OR circuits. Reference character D is a delay circuit, C, a capacitor, R, a resistor and reference character S, a switch such as an analog switch. The operation of the switch is shown in FIG. 14. When the terminal (1) is at a high level, the terminals (2) and (3) are shorted, and when the terminal (1) is at a low level, an open state is established between the terminals (2) and (3); that is, the switch is open. Hereinafter, the high level and the low level will be abbreviated into "H" and "L", respectively, when applicable. In the case of the J-K flip-flop, the terminal Q is at "H" when the terminal S is at "L" and the terminal R is at "H", and the terminal Q ia at "L" when the terminal S is at "H" and the terminal R is at "L".

The operation of the control circuit of FIG. 13 will now be described. When a switch $SW_1$ (for instance, the start switch of the focus detecting device) is in "off" state, the terminals S of the flip-flops in the groups A and A' are at "L". The flip-flops $FF_1$ and $FF_1'$ are placed in "L" state by means of the OR circuits $A_8$, $A_5$ and $A_6$ and the resistor $R_8$ and the terminals R, being applied with a voltage $V_{cc}$ through the resistor $R_2$ and the OR circuits $A_{10}$ and $A_{11}$ are set to "H". Thus, all the terminals Q are set to "L". As a result, the terminals S of the flip-flops in the groups C and C' are set to "L", and the terminals Q are set to "L" because the voltage $V_{cc}$, or the "H" signal, is applied to the terminals R through the resistors $R_2$.

Thus, the switches $S_1$ through $S_n$ and $S_1'$ through $S_n'$ are placed in open state, and therefore no outputs for the photo-electric conversion element group 11b are produced. On the other hand, the terminals Q of the flip-flops $FF_O$ and $FF_O'$ are set to "L" because the outputs of the OR circuits $A_3$ and $A_7$ are at "L". Also, the switch $S_O$ and the switch $S_O'$ are placed in shorted state and in open state, respectively by means of the flip-flop $FF_O'$ and the inverter $A_9$. In this case, the control signals ③ and ④ are at "L".

When the switch $SW_1$ is turned on, with the the aid of the control signal 2 the photographing lens 2 is moved in one direction from ∞ to the near point (or the near point to ∞) by the operation of the motor and motor driving circuit 20. As a result, the reset states of all the flip-flops are released. Thereafter, the terminals S of the flip-flops $FF_1$ and $FF_1'$ are momentarily set to "H" by means of the capacitor $C_O$, the resistor $R_3$ and the OR circuits $A_8$, $A_5$ and $A_6$. Therefore the terminals Q are raised to "H". As a result, the terminals S of the flip-flops $F_1$ and $F_1'$ are also raised to "H" momentarily with the aid of the resistors $R_1$ and $R_1'$ and capacitors $C_1$ and $C_1'$, and the terminals Q are raised to "H". Thus, the switches $S_1$ and $S_1'$ are placed in the shorted state and the output difference $i_1 \sim i_1'$ of the photo-electric conversion elements $d_1$ and $d_1'$ is obtained at the output of the differential circuit 15. With the aid of the inverter $A_2$ and the AND circuit $A_1$, a repetitive pulse is applied to the terminals $C_1$ of the flip-flops in the groups C and C' by the control signal ① from the oscillation circuit 13. Therefore, the terminals Q of the flip-flops $F_2$ and $F_2'$ are set to "H", and the switches $S_2$ and $S_2'$ are placed in the shorted state.

In other words, as in the above-described case, the output difference $i_2 \sim i_2'$ is obtained at the output of the differential circuit 15. The flip-flops in each of the groups A, A', C and C' forms a ring couter and therefore the number of the terminals Q at "H" is only one in each group at all times.

Next, by the pulse of the control signal ①, the terminals Q of the flip-flops $F_3$ and F' are set to "H", and the output difference $i_3 \sim i_3'$ is obtained at the output of the differential circuit 15. Similarly, the terminals Q of the n-th flip-flops $F_n$ and $F_n'$ are set to "H", and the output difference $i_n \sim i_n'$ is provided at the output of the differential circuit 15, and the terminals Q of the flip-flops in the groups C and C' are set to "L" via the OR circuit $A_4$. The resistor $R_9$ is first set the input to the OR circuit $A_4$ to "L".

Because the input to the OR circuit $A_4$ is applied to the terminals $C_1$ of the flip-flops in the group A when the switch $S_O$ is closed, the terminal Q of the flip-flop $FF_2$ is raised to "H", and the terminal Q of the flip-flop $F_2$ is set to "H" with the aid of the resistor $R_2$ and the capacitor $C_2$. Simultaneously, the terminals R of the flip-flops in the group A' are set to "L" via the OR circuit $A_{11}$, and the terminal Q of the flip-flop $FF_1'$ is set to "H" again via the OR circuit $A_6$. Therefore, the output difference $i_2 \sim i_1'$ is obtained at the output of the differential circuit 15.

In succession with this operation, with the aid of the pulses of the control signal ①, the outputs $i_3 \sim i_2'$, $i_4 \sim i_3'$, ... and $i_n \sim i_{n-1}'$ are provided by the differential circuit 15. Similarly, the flip-flops in the groups C and C' are reset and the terminal Q of the flip-flop $F_3$ raised to "H". Simultaneously, the terminal Q of the flip-flop $F_1'$ is raised to "H" and the output difference $i_3 \sim i_1'$ is obtained at the output of the differential circuit 15.

When the terminal Q of the flip-flop $FF_n$ is raised to "H", the terminal Q of the flip-flop $FF_O$ is raised to "H" via the OR circuit $A_3$. Therefore, the switch $S_O$ is opened and the switch $S_O'$ is closed.

In other words, in the above-described case, the flip-flops in the group A are operated and the outputs $i_1 \sim i_1'$, ... $i_n \sim i_n'$, $i_2 \sim i_1'$ ... $i_n \sim i_{n-1}'$ are produced by the differential circuit 15. However, in the present case, the flip-flops in group A' are operated and similarly the outputs $i_2' \sim i_1 \ldots i_n' \sim i_{n-1} \ldots i_n' \sim i_1$, that is, the outputs $i_{m+p} \sim i_m'$ and $i_{m+p}' \sim i_m$ (m=1, 2, 3, ... n, and p=0, 1, 2, 3, ... n−1) are produced by the differential circuit 15. The outputs are applied to the various circuits in FIG. 10 to obtain the focus detection output $V_{OUT4}$ $$= \sum_{p=0}^{n-1} \sum_{m=1}^{n-p} | i_{m+p} - i_m' | + \sum_{p=1}^{n-1} \sum_{m=1}^{n-p} |i'_{m+p} - i_m |$$

of this invention. This operation is repeated by the inversion of the state of the flip-flop $FF_O$, so that the focus detection outputs $V_{OUT4}$ for the lens extending positions can be obtained.

In the above-described control circuit, the maximum value p is (n−1); however, the following equation of focus detection output in a range of (l=1, 2, 3, ... n−1):

Focus detection output $V_{OUT4} =$ $$\sum_{p=0}^{l} \sum_{m=0}^{n-p} | i_{m+p} - i_m' | + \sum_{p=1}^{l} \sum_{m=1}^{n-p} | i'_{m+p} - i_m |$$

In this connection, the smaller the value l, the less the amount of focus detection output information.

The control signal ③ is set to "H" by the operations of the OR circuit $A_7$ and the flip-flop $FF_O'$ during the calculation of the output $V_{OUT4}$. The control signal 4 is set to "H" for a period of time a little later than the above-described calculation by means of the capacitor $C_O'$ and the resistor $R_O'$. That is to say the signal controls the sampling time of the sample hold circuit. The control signal ② operates to turn off the switch $SW_1$ when the proper focus is obtained, i.e., when the photographing lens is stopped. When the switch $SW_1$ is turned on again, the photographing lens is returned to the position of ∞ or the near point. The switch $SW_1$ may be operated in such a manner that after one output $V_{OUT4}$ has been detected, it is turned off and then it is turned on again. However, in this case, it is necessary to stop the on-off operation of the switch $SW_1$ when the photographing lens is stopped and to return the photographing lens to the position of ∞ or the near point when focus detection is started. The resistors $R_1$ through $R_8$ are employed to maintain the inputs to the various logic elements related to the ground. The resistor $R_o'$ is the input resistance of the comparator 15.

FIG. 2 shows one example of an arrangement capable of improving the focus detection accuracy. In this arrangement, the optical image splitter 21 such as a microprism is placed at a position optically equivalent to the position of a film surface. An objects's image is divided into a number of parts by the micro-prism, which are formed on a group of photo-electric conversion elements 11 by an image forming lens 22. In this case, as the contrast is degraded when the focalization is not obtained, the focus detection accuracy is improved. If self-scanning type elements are employed as the photo-electric conversion elements, the constructons of the control circuit, etc. can be simplified. The outputs of the group of photo-electric conversion elements 11 may be applied to the differential circuit 15 being subjected to compression.

As is apparent from the above description, according to the invention, more signals can be obtained for focusing with a relatively small number of photo-electric conversion elements, and therefore the focus detection can be carried out with high accuracy. Since the number of photo-electric conversion elements is relatively small as mentioned above, the variations of the outputs of these elements are relatively little. The focus detecting device itself can be miniaturized because the circuits and optical systems included therein are simple. The movable parts thereof are only the motor and the photographing lens. Therefore, the focus detecting device according to the invention is suitable for a single lens reflex camera.

It is apparent that other modifications are possible without departing from the essential scope of this invention.

What is claimed is:

1. A focus detecting device in a single lens reflex camera comprising: a lens system, an optical image splitter for splitting an object image into various partial images, said image splitter disposed at a position optically equivalent to that of a film surface in said single lens reflex camera, photo-electric conversion means arranged into at least two rows, each row having a plurality of photo-electric conversion elements, said rows being disposed symmetrically with respect to a center line and, image projecting means for projecting said partial images onto said photo-electic conversion elements, said projecting means having an optical axis which optically corresponds to said center line, and signal processing means receiving signals from said photo-electric conversion elements for providing an output value:

$$\sum_{p=1}^{l} \sum_{m=1}^{n-p} |i_m - i'_{m+p}| + \sum_{p=1}^{l} \sum_{m=1}^{n-p} |i'_m - i_{m+p}|,$$

said output value of said signal processing means having a maximum value when proper focus is obtained, where: n is the number of said photo-electric conversion elements in each row, p is the parameter of the mutual positional relationship of said photo-electric conversion elements for obtaining output difference, m is the element number of said photo-electric conversion elements, i and i' are outputs corresponding to incident light quantities of photo-electric conversion elements in said rows, and l is an integer defined by $1 \leq l \leq (n-1)$ and in the range of p.

2. A focus detecting device as defined in claim 1, wherein, said image projecting means has image magnification factor in a direction vertical to said center line, which is larger than that in a direction parallel thereto.

3. A focus detecting device defined in claims 1 or 2, wherein said photo-electric conversion means is self-scanning type image sensor.

4. A focus detecting device as defined in claims 1 or 2, wherein said image projecting means is a micro-prism.

5. A focus detecting device as defined in claims 1 or 2 further comprising motor means responsive to the output of said signal processing means for operating said lens system to focus on said object to provide a maximum output of said conversion means.

6. A focus detecting device as defined in claim 5 wherein said signal processing means comprises a control circuit receiving the output of said conversion means, a differential circuit receiving selective outputs of said conversion means in a predetermined order from said control circuit, an absolute value circuit receiving the output of said differential circuit, an integrating circuit for integrating the absolute value output of said absolute value circuit, a sample and hold circuit responsive to said control circuit, and an extreme value detecting circuit, said extreme value circuit providing an output to drive said motor means until the input thereto reaches a maximum value and thereafter terminating the output to said motor means, wherein said lens system is positioned at a position of proper focus when the output of the sample and hold circuit reaches a maximum value.

7. The focus detecting device of claim 1 wherein said signal processing means comprises a control circuit having:

first (C) and second (C') enabling registers each having n stages, each of said n stages associated with one of said conversion elements, said first and second enabling registers providing first and second enabling outputs to said conversion elements at first and second selected stages, said first and second enabling registers havng enabling clock inputs whereby said first and second enabling outputs are shifted to adjacent stages in said first and second enabling registers in response to signals at said enabling clock inputs;

first (A) and second (A') control registers having n stages each associated with one of said n stages in said first and second enabling registers, said first and second control registers providing first and second control outputs to said associated n stages of said first and second enabling registers, said first and second control registers having control clock inputs whereby said first and second control outputs are shifted to adjacent stages in said first and second control registers in response to signals at said control clock inputs, said control outputs initializing the location of said enabling outputs at the start of a subinterval;

said enabling clock inputs receiving signals during said subinterval;

control logic for selectively providing signals to said control clock inputs before and after said subintervals; and switch means for delivering the output of first and second conversion elements associated with said first and second selected stages to absolute difference forming and summation means so as to provide said output value.

8. A focus detecing device in a single lens reflex camera comprising: a lens system, a pair of groups of photo-electric conversion elements adjacent to one another and aligned in the form of a pair of closed curves in a plane whose position is optically equivalent to that of a film surface in said single lens reflex camera, said groups each having photo-electric conversion elements $d_1, d_2, \ldots d_n$ and $d_1', d_2', \ldots d_n'$, and signal processing means receiving signals from said photo-electric conversion elements for providing an output value:

$$\sum_{p=0}^{l} \sum_{m=1}^{n-p} |i_m - i_{m+p}| + \sum_{p=1}^{l} \sum_{m=1}^{n-p} |i_m' - i_{m+p}'|,$$

said output value having a maximum value when proper focus is obtained, where, n is the number of each group of photo-electric conversion elements in each group, p is the parameter of the mutual positional relation of said photo-electric conversion elements for obtaining output difference, m is the element number of a photo-electric conversion element, i and i' are outputs corresponding to incident light quantities of photo-electric conversion elements in said groups, and l is an integer defined by $1 \leq l \leq (n-1)$ and in the range of p.

9. A focus detecting device as defined in claim 8, wherein said pair of groups of photo-electric conversion elements are self-scanning type image sensors.

10. A focus detecting device as defined in claims 8 or 9, wherein said output value is further defined as:

$$\sum_{p=0}^{n-1} \sum_{m=1}^{n-p} |i_m - i_{m+p}| + \sum_{p=0}^{n-1} \sum_{m=1}^{n-p} |i_m' - i_{m+p}'|.$$

11. A focus detecting device as defined in claim 8, further comprising an optical image splitter for splitting an object image into various partial images, said image splitter disposed at a position optically equivalent to that of a film surface in said single lens reflex camera, and image projecting means for projecting said various partial images onto said pair of groups of photo-electric conversion elements adjacent to one another and aligned in the form of a closed curve in a plane in the body of said single lens reflex camera, wherein an output defined by the following expression is detected, said output having a maximum value when proper focus is obtained, $$\sum_{p=0}^{l} \sum_{m=1}^{n-p} |i_m - i_{m+p}| + \sum_{p=1}^{l} \sum_{m=1}^{n-p} |i_m' - i_{m+p}'|.$$

12. A focus detecting device as defined in claim 11, wherein said pair of groups of photo-electric conversion elements are self-scanning type image sensors.

13. A focus detecting device as defined in claim 11, wherein saisd optical image splitter is a micro-prism.

14. A focus detecting device as defined in claims 11, 12, or 13, wherein said output value is further defined as:

$$\sum_{p=0}^{n-p} \sum_{m=1}^{n-p} |i_m - i_{m+p}| + \sum_{p=1}^{n-1} \sum_{m=1}^{n-p} |i_m' - i_{m+p}'|.$$

15. A focus detecting device as defined in claims 11 or 12 further comprising motor means responsive to said output value of said signal processing means for operating said lens system to focus on said object to provide a maximum output of said conversion means.

16. A focus detecting device as defined in claim 15 wherein said signal processing means comprises a control circuit receiving the output of said conversion means, a differential circuit receiving selective outputs of said conversion means in a predetermined order from said control circuit, an absolute value circuit receiving the output of said differential circuit, an integrating circuit for integrating the absolute value output of said absolute value circuit, a sample and hold circuit responsive to said control circuit, and an extreme value detecting circuit, said extreme value circuit providing an output to drive said motor means until the input thereto reaches a maximum value and thereafter terminating the output to said motor means, wherein said lens system is positioned at a position of proper focus when the output of the sample and hold circuit reaches a maximum value.

* * * * *